United States Patent
Woo et al.

(10) Patent No.: US 8,867,784 B2
(45) Date of Patent: Oct. 21, 2014

(54) APPARATUS AND METHOD FOR DETECTING A VERTEX OF AN IMAGE

(75) Inventors: Woontack Woo, Gwangju (KR); Youngkyoon Jang, Gwangju (KR)

(73) Assignee: Gwangju Institute of Science and Technology, Buk-Gu, Gwangju (KR)

( * ) Notice: Subject to any disclaimer, the term of this patent is extended or adjusted under 35 U.S.C. 154(b) by 10 days.

(21) Appl. No.: 13/512,188

(22) PCT Filed: Oct. 28, 2010

(86) PCT No.: PCT/KR2010/007485
§ 371 (c)(1),
(2), (4) Date: May 25, 2012

(87) PCT Pub. No.: WO2011/065671
PCT Pub. Date: Jun. 3, 2011

(65) Prior Publication Data
US 2012/0257791 A1    Oct. 11, 2012

(30) Foreign Application Priority Data

Nov. 26, 2009   (KR) .................. 10-2009-0115365

(51) Int. Cl.
*G06K 9/00*     (2006.01)

(52) U.S. Cl.
USPC ........................................ 382/103

(58) Field of Classification Search
USPC .................. 382/103, 195, 199, 202, 203
See application file for complete search history.

(56) References Cited

U.S. PATENT DOCUMENTS

| 8,411,080 B1* | 4/2013 | Zimmermann .............. 345/419 |
| 8,438,472 B2* | 5/2013 | Mansfield et al. ........... 715/234 |
| 2012/0148094 A1* | 6/2012 | Huang et al. .................. 382/103 |

* cited by examiner

*Primary Examiner* — Yon Couso
(74) *Attorney, Agent, or Firm* — Nath, Goldberg & Meyer; Joshua B. Goldberg

(57) ABSTRACT

Disclosed are an apparatus for detecting a vertex of an image and a method for the same detecting the vertex with the high degree of accuracy and reducing time to detect the vertex by minimizing the interaction operations of the user to detect the vertex even in a touch input part having the low degree of sensing precision. The method includes inputting a vertex position of an image, setting an ROI, detecting a plurality of edges, detecting a candidate straight line group based on the edges, and removing a candidate straight line forming forms an angle less than a critical angle with respect to a base candidate straight line set from the candidate straight line group, and determining an intersection point between a remaining candidate straight line and the base candidate straight line provided at a position making a minimum distance from the input vertex position as an optimal vertex.

18 Claims, 13 Drawing Sheets

(a)

(b)

(a)

(b)

(a)

(b)

(a)

(b)

(a)

(b)

APPARATUS AND METHOD FOR DETECTING A VERTEX OF AN IMAGE

This is a National Phase Application filed under 35 U.S.C. 371 as a national stage of PCT/KR2010/007485 filed Oct. 28, 2010, and claims priority benefit from Korean Application No. 10-2009-0115365, filed Nov. 26, 2009, the content of each of which is hereby incorporated by reference in its entirety.

BACKGROUND OF THE INVENTION

1. Field of the Invention

The present invention relates to an apparatus for detecting a vertex of an image and a method for the same. In more particular, the present invention relates to an apparatus for detecting the optimal vertex based on vertexes in a region of interesting (ROI) input by a user and a method for the same.

2. Description of the Related Art

Recently, technologies of modeling an object by employing an object image of a real world, which has been previously photographed, as a background image and selecting and adjusting coordinates of vertexes of the object has been spotlighted.

In general, in order to perform the modeling of the object, the user must select vertexes of the object and adjust the selected vertexes to correct coordinates. As described above, the vertex detection in the process of the object modeling has been performed through an algorithm having the interaction with many users and a slow processing rate. In addition, since the vertex detection in the process of the object modeling has never been attempted in a mobile phone, object modeling cannot be performed in situ.

When the object modeling is performed in the mobile phone, the selection of correct vertexes and fine adjustment are required due to the low degree of precision of a touch screen mounted on the mobile phone, In this case, the user must perform many interaction operations, so that the user may feel fatigue.

FIG. 1 is a flowchart for vertex detection in modeling steps according to the related art.

According to one example of the related art, Hengel has suggested a scheme of modeling a scene by inputting a video sequence for the purpose of object modeling of the real world. The object modeling scheme of Hengel is disclosed in a reference [A. v. d. Hengel, et al., "Video Trace: Rapid Interactive Scene Modeling from Video," ACM Transactions on Graphics, vol. 26, no. 3, article 86, July, 2007.] in detail.

Referring to FIG. 1, according to the Hengel scheme, in order to select the vertexes of an object, the whole images of each frame of a video are subject to a segmentation process, and the edges of the images are detected based on superpixels. However, the mobile phone having a low computing power spends significant processing time to perform the above procedure. In addition, according to the Hengel scheme, in order to select vertexes at correct positions, a selection operation based on mouse-input and an adjustment operation must be repeatedly performed. However, the mobile phone equipped with a touch screen having the low degree of sensing precision has a difficulty in the correct selection of the vertexes and the fine adjustment.

Meanwhile, the details of edge detection based on superpixels is disclosed in a reference [X. Ren, et al., "Learning a Classification Model for Segmentation," In Proc. $9^{th}$ ICCV, vol. 1, pp. 10-17, 2003.].

According to another related art, in a modeling scheme of reconstructing a building in a real world into a 3-D structure, Gibson has suggested a scheme of overlapping a frame box model serving as a basic unit with an image without directly selecting a vertex, and repeatedly adjusting a vertex of a suggested model to a vertex of the building in the image, thereby matching the vertexes with each other. However, similarly to the Hengel scheme, the Gibson scheme has a difficulty in the fine adjustment under the environment of the mobile phone.

The Gibson modeling scheme is disclosed in a reference [S. Gibson, et al., "Interactive Reconstruction of Virtual Environments from Video Sequences," Computers & Graphics, vol. 27, pp. 293-301, 2003] in detail.

SUMMARY OF THE INVENTION

An object of the present invention is to provide an apparatus for detecting a vertex of an image and a method for the same, which can improve an image processing speed for vertex detection and minimizing an error rate by minimizing user interactions for the vertex detection and previously removing a straight line having low possibility to form a vertex among a candidate straight line group used to form the vertex.

Another object of the present invention is to provide an apparatus for detecting a vertex of an image and a method for the same, which can be applicable to vision applications such as object modeling requiring the high degree of accuracy in a device equipped with a touch screen having the low degree of sensing precision (with error of 10 pixels or less).

Still another object of the present invention is to provide an apparatus for detecting a vertex of an image and a method for the same, which can provide convenience to a user by omitting a fine adjustment process when detecting a vertex by requesting the minimum interactions (one interaction) from the user even if the object modeling is performed on the touch screen having the low degree of sensing precision.

In order to accomplish the object, of the present invention, according to an aspect of the present invention, there is provided an apparatus for detecting a vertex of an image. The apparatus includes an UI part used to display an image and input a vertex position of the image, an ROI setting part to set an ROI including the input vertex position, an edge detector to detect a plurality of edges from an image in the ROI, and to detect a candidate straight line group based on the edges, and a vertex detector to remove a candidate straight line, which forms an angle less than a critical angle with respect to a base candidate straight line set from the candidate straight line group, and to determine an intersection point between a remaining candidate straight line and the base candidate straight line, which is provided at a position making a minimum distance from the input vertex position, as an optimal vertex.

The UI part includes a display part having a degree of sensing precision with an error of 10 pixels or less.

The display part is a touch screen installed in a mobile phone and is used to realize an UI.

The ROI setting part sets the ROI having a preset range formed about the input vertex position.

The edge detector removes a camera image noise by applying a Gaussian blur function to the image of the ROI, and detects the edges by using a canny edge detector.

The edge detector transforms the edges into the candidate straight line group expressed by a parameter set having an angle and a distance by applying a Hough transform to the edges.

The edge detector arranges candidate straight line groups in descending order from a greatest number of times of being voted when performing the Hough transform.

The vertex detector sets a predetermined candidate straight line, which belongs to the candidate straight line group and has the greatest number of times of being voted, as the base candidate straight line.

The vertex detector removes a corresponding candidate straight line group if a difference between an angle of the candidate straight line group and an angle of the base candidate straight line is less than the critical angle, and a difference between a distance of the candidate straight line group and a distance of the base candidate straight line is less than a critical distance.

The vertex detector removes a candidate straight line of the candidate straight line group, which makes a difference less than a critical distance with respect to a distance of the base candidate straight line, from a base candidate straight line group.

According to another aspect of the present invention, there is provided a method of detecting a vertex of an image. The method includes inputting a vertex position of an image, setting an ROI including the input vertex position, detecting a plurality of edges from an image in the ROI, detecting a candidate straight line group based on the edges, and removing a candidate straight line, which forms an angle less than a critical angle with respect to a base candidate straight line set from the candidate straight line group, and determining an intersection point between a remaining candidate straight line and the base candidate straight line, which is provided at a position making a minimum distance from the input vertex position, as an optimal vertex.

In the detecting of the edges, a camera image noise is removed by applying a Gaussian blur function to the image of the ROI, and the edges are detected by using a canny edge detector.

In the detecting of the candidate straight line group, the edges are transformed into the candidate straight line group expressed by a parameter of an angle and a distance by applying a Hough transform to the edges.

In the detecting of the candidate straight line group, candidate straight line groups are arranged in descending order from a greatest number of times of being voted when performing the Hough transform.

In the detecting of the vertex point, a predetermined candidate straight line, which belongs to the candidate straight line group and has the greatest number of times of being voted, is set as the base candidate straight line.

In the detecting of the vertex point, a corresponding candidate straight line group is removed if a difference between an angle of the candidate straight line group and an angle of the base candidate straight line is less than the critical angle, and a difference between a distance of the candidate straight line group and a distance of the base candidate straight line is less than a critical distance.

In the detecting of the vertex, a candidate straight line of the candidate straight line group, which makes a difference less than a critical distance with respect to a distance of the base candidate straight line, is removed from a base candidate straight line group.

As described above, in an apparatus for detecting a vertex of an image and a method for the same according to the embodiment of the present invention, when detecting the vertex in an object modeling process, a mobile phone equipped with a touch screen having the low degree of sensing precision can accurately detect the vertex without an existing vertex adjustment step.

In the apparatus for detecting a vertex of an image and the method for the same according to the embodiment of the present invention, an image processing speed for vertex detection can be improved and an error rate can be minimized by minimizing user interactions for the vertex detection and previously removing a straight line having low possibility to form a vertex among a candidate straight line group used to form the vertex.

In the apparatus for detecting a vertex of an image and the method for the same according to the embodiment of the present invention, even if the object modeling is performed on the touch screen having the low degree of sensing precision, the vertex can be detected with the high degree of the precision, so that the manufacturing cost of an object modeling device can be reduced.

BRIEF DESCRIPTION OF THE DRAWINGS

FIGS. 6(a) and 6(b) show the edge detection for the ROI, in which FIG. 6(a) shows edges detected without applying a blur function, and FIG. 6(b) shows edges detected after the blur function is applied;

FIGS. 7(a) and 7(b) show detection of the straight lines through the Hough transform and semi-automatic vertex detection through a proposed algorithm in which FIG. 7(a) shows an initial candidate straight line detection based on the Hough transform, and FIG. 7(b) shows the detection of a main straight line and the optimal vertex detection through the proposed algorithm;

FIGS. 8 to 10(b) show the results of 2-D modeling based on the vertex detection of the image according to the present invention in which FIG. 8 shows the 2-D modeling of a smart table image, FIGS. 9(a) and 9(b) show 2-D modeling based on the detection of outer vertexes of the table image taken at another angle (9(a): desktop computer, 9(b): mobile phone), and FIGS. 10(a) and 10(b) show 2-D modeling based on the vertex detection based on the window image including a narrow-width frame (left: desktop computer, right: mobile phone);

FIGS. 11(a) and 11(b) are views showing an experimental procedure of the degree of sensing precision of the touch screen in which FIG. 11(a) is a view showing the position of the first marked target (dot), and FIG. 11(B) is a view showing the sequence in which the target dot appears;

DETAILED DESCRIPTION OF THE INVENTION

Figure 1:
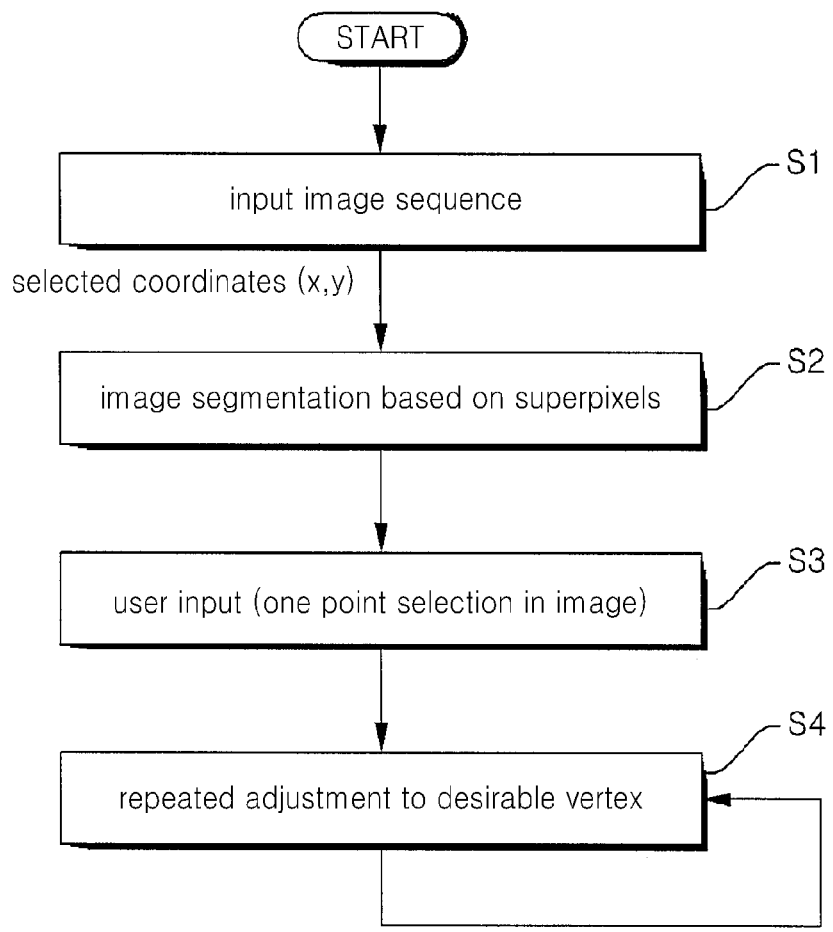
FIG. 1 is a flowchart for vertex detection in modeling steps according to the related art.

Hereinafter, an exemplary embodiment of the present invention will be described in detail with reference to accompanying drawings. The same reference numerals will be assigned to the same elements although elements are shown in different drawings. If it is determined that the details of the structure and the function of generally-known elements make the subject matter of the present invention unclear, the details thereof will be omitted. In addition, a term expressed in a singular number may contain a plural concept. In the following description of exemplary embodiments of the present invention, the technical spirit of the present invention is not limited thereto, but the embodiment includes various modifications and applications.

Figure 2:
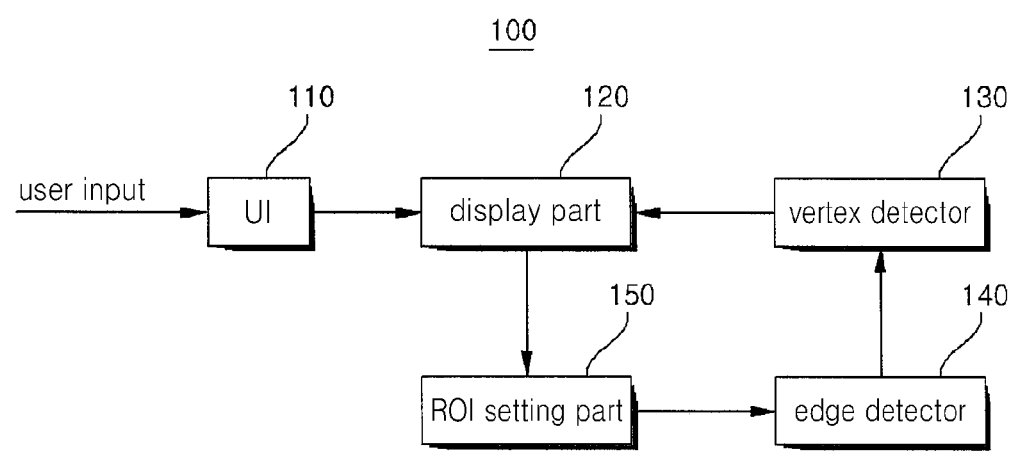
FIG. 2 is a functional block diagram showing the structure of an apparatus for detecting a vertex of an image according to the embodiment of the present invention.

FIG. 2 is a functional block diagram showing the structure of an apparatus 100 for detecting a vertex of an image according to the embodiment of the present invention.

Referring to FIG. 2, the apparatus 100 for detecting a vertex of an image according to the embodiment of the present invention includes an UI 110, a screen 120, a region of interesting (ROI) setting part 150, an edge detector 140, and a vertex detector 130 to detect the optimal vertex based on a vertex input selected by a user.

According to the present embodiment, the UI 110 is realized on the screen 120 under the mobile environment.

The screen 120 is a screen mounted on a mobile phone while representing the degree of sensing precision with the error of 10 pixels or less. The UI 110 is realized on the touch screen. The touch screen displays an image for vertex detection and receives a vertex position of the image from the user.

If the information of the vertex position is input through the touch of the user, the ROI setting part 150 sets a predetermined region of the image as a region for vertex detection in such a manner that the region contains the vertex position. In this case, the ROI may be set in a circular shape or a rectangular shape about the input vertex position.

The edge detector 140 removes noise from a camera image by applying a Gaussian blur function to the image of the ROI and detecting the edges of the image of the ROI by using a canny edge detector. Although the present embodiment employs the canny edge detector, various edge detectors such as a Roberts edge detector, a Sobel edge detector, and a Prewitt edge detector can be employed.

The edge detector 140 transforms the detected edges into a candidate straight line group expressed by parameters of an angle and a distance by applying a Hough transform to the detected edge. When performing the Hough transform, candidate straight line groups are arranged in the order of the number of times of being voted. In other words, the edge detector 130 arranges transform values in Hough regions corresponding to the edges in the order of long lengths of straight lines of the edges.

The vertex detector 130 may set a predetermined candidate straight line belonging to the candidate straight line group as a base candidate straight line. If the base candidate straight line is set, candidate straight lines, which are parallel to the base candidate straight line or approximately parallel to the base candidate straight line within the margin of a preset error angle, are removed. Thereafter, intersection points with remaining candidate straight lines, which are perpendicular to the base candidate straight line or approximately perpendicular to the base candidate straight line within the margin of a preset error angle, are found. In this case, preferably, the first candidate straight line among the arranged candidate straight lines is set as the base candidate straight line.

As described above, the time to calculate the intersection points can be significantly shorted in the following processes by performing an algorithm to remove the candidate straight lines parallel to the base candidate straight line or approximately parallel to the base candidate straight line within a preset error angle.

As described above, a candidate straight line having the greatest number of times of being voted is set as the base candidate straight line, thereby preventing a candidate straight line having a dominant value from being removed when a candidate straight line created due to noise is set as the base candidate straight line.

The vertex detector 130 removes candidate straight lines making angles, which are less than a critical angle, together with the set base candidate straight line and determines an intersection point between the remaining candidate straight line and the base candidate straight line, which is provided at a position having the minimum distance from the input vertex position, as an optimal vertex.

In other words, the vertex detector 130 removes a candidate straight line group if the difference between the angle of the candidate straight line group and the angle of the base candidate straight line is less than a critical angle, and the difference between the distance of the candidate straight line group and the distance of the base candidate straight line is less than a critical distance.

The vertex detector 130 removes a corresponding candidate straight line of the candidate straight line group, which makes a difference less than the critical distance with respect to the distance of the base candidate straight line, from a base candidate straight line group. As described above, the base candidate straight line group is set by using the dominant candidate straight line, thereby reducing the time required when detecting a vertex.

Figure 3:
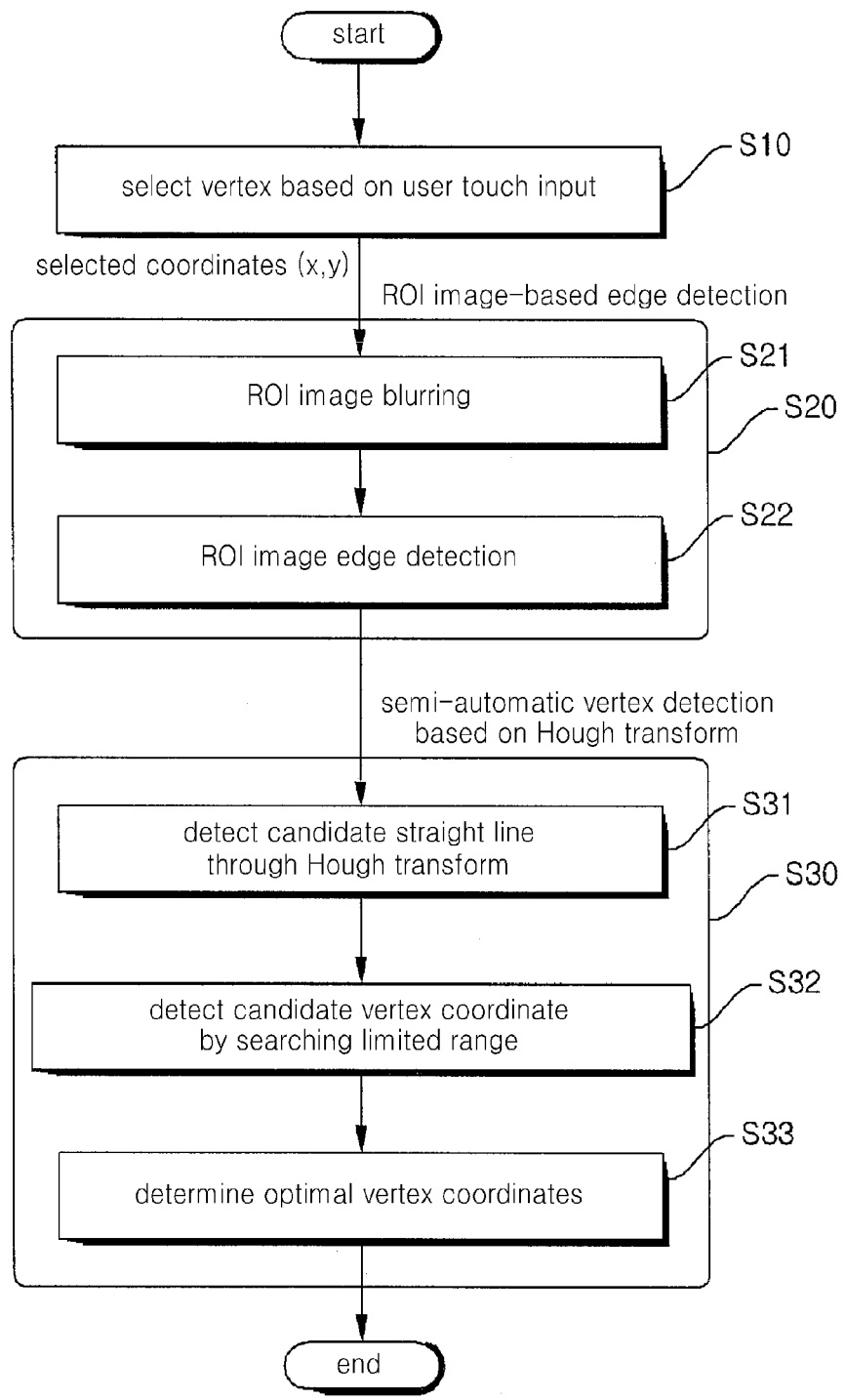
FIG. 3 is a flowchart showing a method of detecting the vertex of the image according to the embodiment of the present invention.

FIG. 3 is a flowchart showing a method of detecting a vertex of an image according to the embodiment of the present invention.

Referring to FIG. 3, the method of detecting the vertex of the image of the embodiment of the present invention includes a step of inputting the vertex position of the image (step S10), a step of setting an ROI containing the input vertex position and detecting a plurality of edges from the image in the ROI (step S20), a step of detecting a candidate straight line group used to detect the optimal vertex based on the edges (step S30), and a step of removing candidate straight lines making angles, which are less than a critical angle, together with a base candidate straight line selected from the candidate straight line group, and detecting an intersection point between a remaining candidate straight line and the base candidate straight line, which is provided at a position having the minimum distance from the input vertex position, as an optimal vertex (step S30).

According to the step of detecting edges (step S20), a Gaussian blur function is applied to the image of the ROI, thereby removing image noise (step S21), and the edges are detected by using a canny edge detector (step S22).

According to the step of detecting the candidate straight line group (step S31), the edges are transformed into the candidate straight line group expressed by parameters of an angle and a distance by applying a Hough transform to the detected edges. In this case, according to the step of detecting the candidate straight line group (step S31), candidate straight line groups are preferably arranged in the descending order from the greatest number of times of being voted when the Hough transfer is performed.

According to the step of detecting the vertex (step S32), a predetermined candidate straight line of the candidate straight line group may be selected as the base candidate straight line. All candidate straight lines of the candidate straight line group may be the base candidate straight line. In this case, the candidate straight line having the greatest number of times of being voted is preferably set as the base candidate straight line.

According to the step of detecting the vertex (step S2), if the difference between the angle of the candidate straight line group and the angle of the base candidate straight line is less than the critical angle, and the difference between the distance of the candidate straight line group and the distance of the base candidate straight line is less than the critical distance, a corresponding candidate straight line group is removed.

According to the step of detecting the vertex (step S2), a corresponding candidate straight line of a candidate straight line group making the difference less than the critical distance with respect to the distance of the base candidate straight line from a base candidate straight line group. The algorithm is performed to prevent a candidate straight line having a dominant value from being removed when a nondominant candidate straight line created due to noise is set as the base candidate straight line. In addition, the time to detect the vertex can be reduced.

Hereinafter, an example in which the present invention is applied to vertex detection in objection modeling in a mobile phone equipped with a touch screen will be described in detail with reference to FIGS. 4 to 10.

The step of detecting edges of the image of the ROI will be described in detail with reference to FIG. 4.

Figure 4:
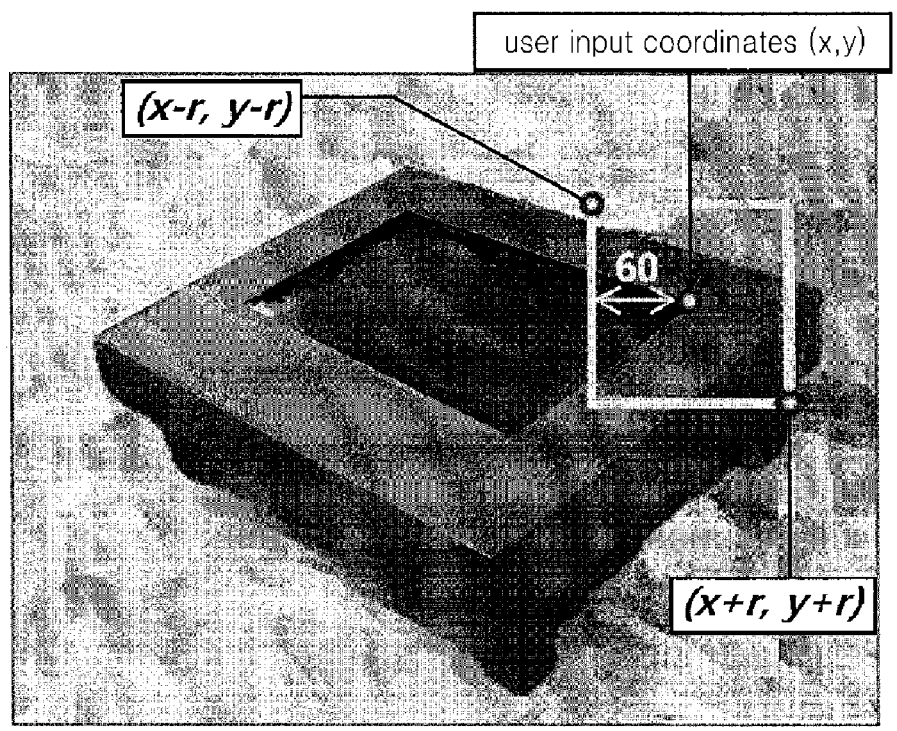
FIG. 4 is a schematic view showing a process of setting a region of interesting (ROI) based on a vertex position input by a user.

FIG. 4 is a schematic view showing the setting of the ROI based on user input coordinates.

Referring to FIG. 4, the ROI is set in the image by expanding a space up, down, left, and right by a variable r from the coordinates selected by the user. In addition, the Gaussian blur function is applied to the inner part of the ROI created with coordinates (x−r, y−r) of the left upper end and coordinates (x+r, y+r) of the right lower end to minimize the influence of camera noise (step S21). Further, in order to detect the edges, a canny edge detector is applied (step S22). Although the present embodiment employs the canny edge detector, various edge detectors such as a Roberts edge detector, a Sobel edge detector, and a Prewitt edge detector can be employed.

The details of the canny edge detector are disclosed in a reference [J. Canny, "A Computational Approach to Edge Detector," IEEE Trans. Pattern Analysis and Machine Intelligence, vol. 8, no. 6, pp. 679-714, 1986.].

According to the present embodiment, as shown in FIG. 4, in order to set a desirable ROI to a camera input image (640*480), the value of r is set to 60 pixels. The value of is variably adjusted by a developer according to the sensing ability of an application and a touch screen. Although the ROI has the rectangular shape about the vertex position selected by the user, the shape is provided only for the illustrative purpose, and the ROI may be set in a circular shape or in a triangular shape.

Hereinafter, the step (step S31) of detecting the candidate straight line by using the Hough transform will be described in detail with reference to FIG. 5.

According to the present embodiment, the process of detecting a candidate line is detected by applying the Hough transform with respect to the information of the detected edges. In other words, the candidate straight line is detected through the Hough transform [5] receiving a coordinate value of the detected edge. In this case, the Hough transform equation used to detect the candidate straight line is expressed as Equation 1.

$$\rho = x \cos \theta + y \cos \theta \quad \text{Equation 1}$$

In Equation 1, $\rho$ represents a distance from an origin point in a direction orthogonal to a straight line, and $\theta$ represents an angle at which the straight line is inclined. In addition, a coordinate $(x_E, y_E)$ represents the coordinate value of an edge detected through the canny edge detector. In the algorithm according to the present invention, a parameter set PS={$(\rho_{L1}, \theta_{L1}), (\rho_{L2}, \theta_{L2}), \ldots, (\rho_{LN}, \theta_{LN})$} for candidate straight lines N are detected by applying a coordinate set ES={$(x_{E1}, y_{E1}), (x_{E2}, y_{E2}), \ldots, (x_{EN}, y_{EN})$} to Equation 1. In this case, elements of the parameter set PS are sorted in the descending order from the greatest number of times being voted in the Hough transform.

The details of the Hough transform are disclosed in a reference [R. O. Duda, et al., "Use of the Hough Transformation to Detect Lines and Curves in Pictures," Communications of ACM, vol. 15, pp. 11-15, 1972].

In this case, EN in the set ES denotes the total number of edges detected from the canny edge detector, and LN in the set PS denotes the total number of candidate straight lines detected through the Hough transform. According to the present embodiment, the total number of candidate straight lines to be primarily detected is set to 50. In this case, the value of the LN may be variably adjusted by a developer according to the sensing ability of applications and touch screens.

Hereinafter, the step S32 of detecting the optimal vertex by searching a limited range will be described with reference to FIG. 5.

According to the method of detecting a vertex, two optimal candidate straight lines are selected in order to select optimal intersection point coordinates. However, in the worst case, intersection points must be detected LN times with respect to each of the LN candidate straight lines in order to find the optimal intersection coordinates. This decreases the processing time in a mobile phone having insufficient computing power. Therefore, according to the algorithm of the present embodiment, the computational quantity can be reduced while detecting the optimal intersection points by searching a limited range for parameters of LN candidate straight lines.

According to the embodiment, two edges (straight lines) meeting each other at one vertex (intersection points) make a difference by at most $T_T$ in an angle and $T_R$ in a distance. The straight lines, which do not make the difference among candidate straight lines recommended through the Hough transform for a difference by at most $T_T$ in an angle and $T_R$ in a distance, represent the same edge (straight line) of an object or two edges (straight lines) which do not cross each other. Accordingly, the proposed algorithm determines if an intersection point between each of LN candidate straight lines and a straight line to be compared is detected by first determining if the LN candidate straight lines satisfy Equation 2. Therefore, the search range of parameters is suggested so that the computational quantity can be reduced and the erroneous detection of the intersection points can be avoided.

$$F(\rho_b, \theta_b, \rho_c, \theta_c) = \quad \text{Equation 2}$$
$$\begin{cases} \text{true,} & (T_R < \mathit{Dif}(\rho_b \cdot \rho_c)) \wedge (T_T < \mathit{Dif}(\theta_b, \theta_c)) \\ \text{false,} & \text{otherwise} \end{cases}$$

Figure 5:
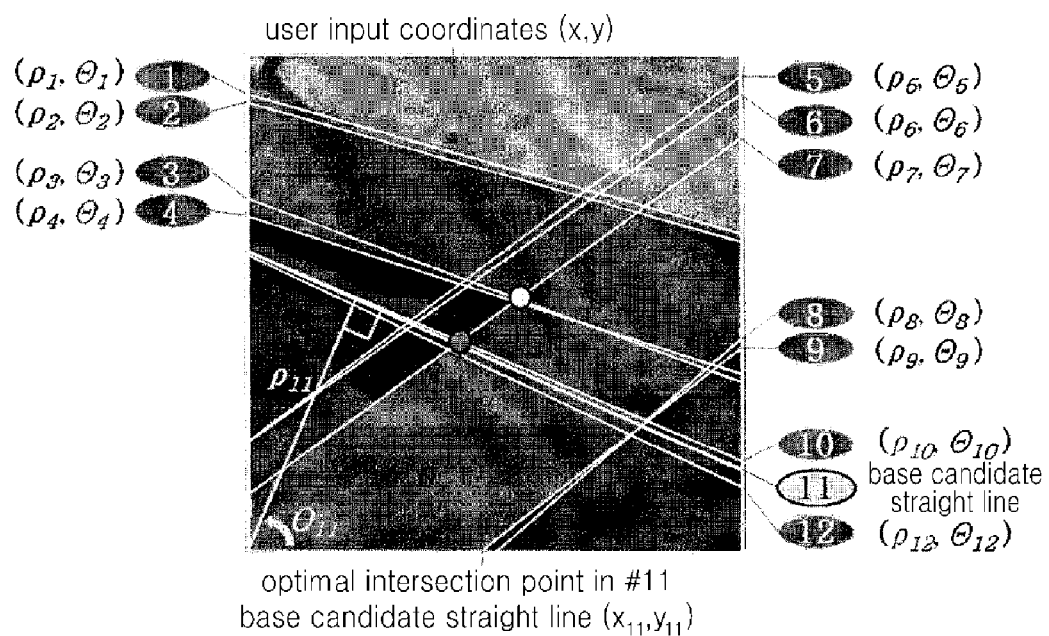
FIG. 5 is a schematic view showing a process of selecting the optimal intersection point coordinate by searching candidate straight lines detected in the ROI a limited range.
Figure 6:
Figure 6:
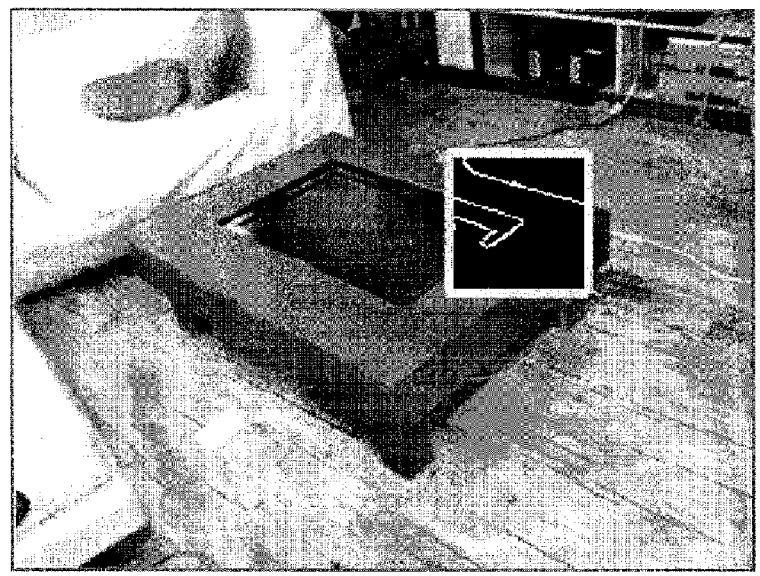
Figure 7:
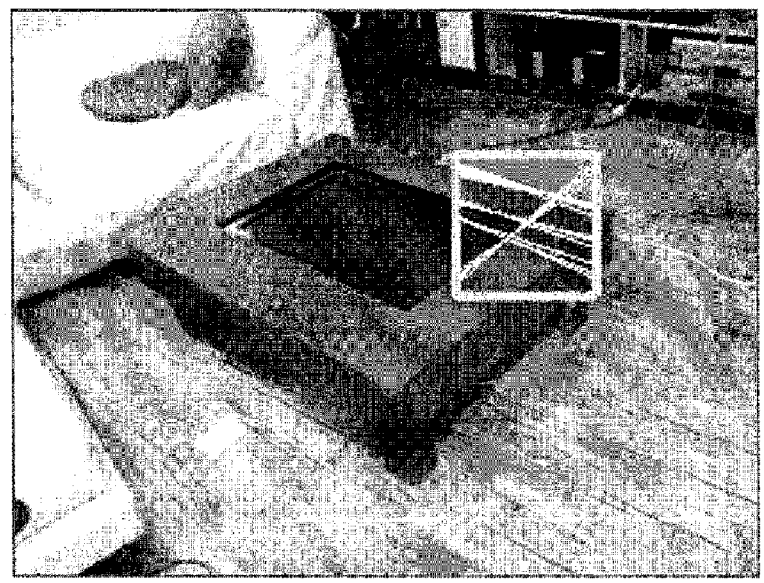
Figure 7:
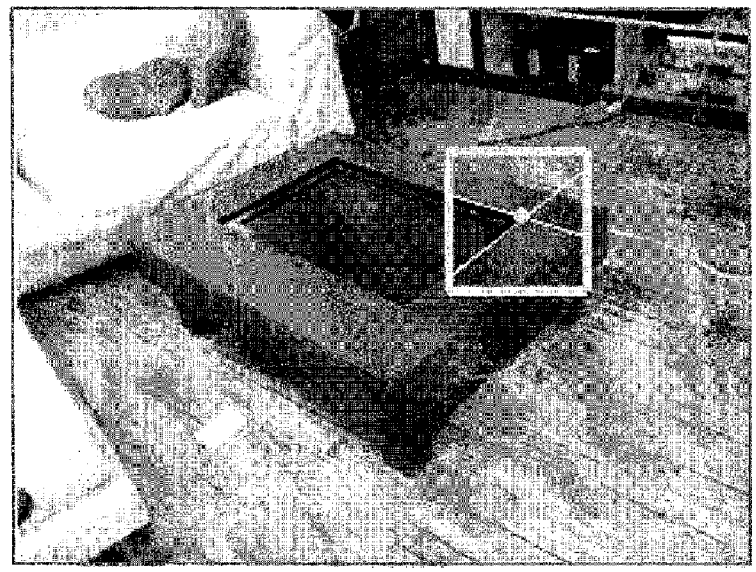

In Equation 2, as shown in FIG. 5, $(\rho_b, \theta_b)$ represents a parameter of a base candidate straight line, and $(\rho_c, \theta_c)$ represents a parameter of a compared candidate straight line. In addition, $T_T$ and $T_R$ represent minimum difference critical values in an angle and a distance which are parameters of mutually compared straight lines, and are set 60 degrees and 5 pixels, respectively, in the present invention. In Equation 2, a function $\text{Dif}(\text{tmp}_1, \text{tmp}_2)$ outputs the difference between parameters $\text{tmp}_1$ and $\text{tmp}_2$ as a return value. In this case, the values $\text{tmp}_1$ and $\text{tmp}_2$ can be variably adjusted by a developer according to the sensing ability of the touch screen.

In the algorithm according to the present invention, as shown in Equation 2, the intersection point between two compared candidate straight line is found only when the difference between $\theta_b$ of the base candidate straight line and $\theta_c$ of one compared candidate straight line is $T_T$ or more, and the difference between $\rho_b$ of the base candidate straight line and $\rho_c$ of another compared candidate straight line is $T_R$ or more. As a result, in Equation 2, only if a true is returned as a value of a function $F(\rho_b, \theta_b, \rho_c, \theta_c)$, intersection point is detected.

FIG. 5 is a schematic view showing candidate straight lines detected in the ROI and the process of selecting the optimal intersection point coordinates by searching a limited range.

Referring to FIG. 5, in the case in which a base candidate straight line is a line 11, intersection point coordinates are not calculated with respect to the candidate straight lines 1, 2, 3, and 4 making a difference of $T_T$ or less from $\theta_{11}$ and candidate straight lines 10 and 12 making a difference of $T_R$ or less from $\rho_{11}$ which is another parameter of the base candidate straight line 11. Accordingly, the processing time can be improved.

As shown in FIG. 5, the intersection point coordinates between the base candidate straight line 11 and candidate straight lines 5, 6, 7, 8, and 9 selected based on the search criteria of the limited range are calculated. Then, an intersection point coordinate closes to the coordinate (x,y) input by a user among the intersection point coordinates is selected as the optimal intersection point coordinate by calculating the pixel distance between each intersection point coordinate and the coordinate (x,y) input by the user. As shown in FIG. 5, the optimal intersection point coordinate is $(x_{11}, y_{11})$ in the case of the base candidate straight line 11. As a result, the optimal intersection point coordinate has the closest pixel distance from the coordinate (x,y) input by the user among elements of an intersection point coordinate candidate set $CS=\{(x_1,y_1), (x_2,y_2), \ldots, (x_{LN}, y_{LN})\}$. Meanwhile, the intersection point in the Hough transform for straight lines may be calculated as expressed as Equation 3.

$$y_b = \frac{\rho_b \cos\theta_c - \rho_c \cos\theta_b}{\sin\theta_b \cos\theta_c - \sin\theta_c \cos\theta_b},$$

$$x_b = \frac{\rho_b - y\sin\theta_b}{\cos\theta_b}$$

Equation 3

In Equation 3, a coordinate $(x_b, y_b)$ refers to an intersection point coordinate between two straight lines created by $(\rho_b, \theta_b)$ and $(\rho_c, \theta_c)$.

The present embodiment is applied to a vertex detection algorithm based on a Hough transform in a mobile phone having a touch screen. In order to acquire an image from a camera embedded in the mobile phone, an API (application programming interface) for the driving of the camera of the mobile phone is used. The image acquired through the API is transferred in the form of RGB565, and the fundamental image processing for the acquired image is achieved through OpenCv library.

The details of the OpenCv library are disclosed in a reference [Intel Open Source Computer Vision Library, http://sourceforge.net/projects/opencvlibrary/(accessed on 2009, Sep. 14)).

The present embodiment is realized on a windows mobile 6.1 platform of a visual C++ 2005. In order to allow a user to input a vertex coordinate, the touch screen embedded in the mobile phone is used. However, this is provided only for the illustrative purpose, and images having different forms may be used when the present invention is applied actually.

In addition, according to the present invention, various development environments may be used in addition to the exemplary implementation environment used for the illustrative purpose. The API and OpenCV library is used to drive a basic camera and simply develop a computer vision algorithm. This is a library in which a typical computer vision algorithm is realized. Accordingly, even if the library is used, the proposed algorithm can be realized without the degradation of the performance thereof.

FIGS. 6(a) and 6(b) show the edge detection for the ROI. According to the present embodiment, an ROI is set based on a coordinate selected through the user input, and the edges of the ROI are detected by using the canny edge detector as shown in FIGS. 6(a) and 6(b). In this case, as shown in FIG. 6(a), many undesirable edges may be detected due to the texture of an object or image noise. Therefore, according to the present embodiment, after applying the Gaussian blur function as shown in FIG. 6(b), the edges are detected.

FIGS. 7(a) and 7(b) show the detection of the straight lines through the Hough transform and the semi-automatic vertex detection through the proposed algorithm. FIG. 7(a) shows the initial candidate straight line detection based on the Hough transform, and FIG. 7(b) shows the detection of a main straight line and the optimal vertex detection through the proposed algorithm. According to the present embodiment, for the purpose of the semi-automatic vertex detection, an initial candidate straight line is detected through the Hough transform as shown in FIG. 7(a). The optimal intersection point coordinate of the detected candidate straight line is detected through a semi-automatic scheme by using parameters of the limited range as shown in FIG. 5. According to the present embodiment, the result of the detected vertex is shown in FIG. 7(b).

Figure 8:
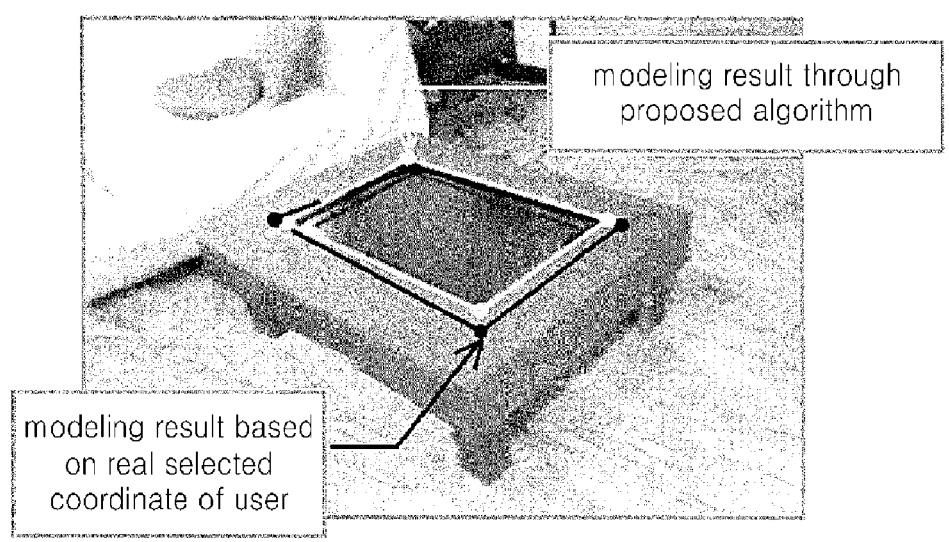

FIG. 8 show the results of 2-D modeling based on the vertex detection of the image according to the present invention. FIG. 8 show the 2-D modeling of a smart table image, and FIGS. 9(a) and 9(b) show 2-D modeling based on the detection of outer vertexes of the table image taken at another angle (9(a): desktop computer, 9(b): mobile phone). FIGS. 10(a) and 10(b) show 2-D modeling based on the vertex detection based on the window image including a narrow-width frame.

Figure 9:
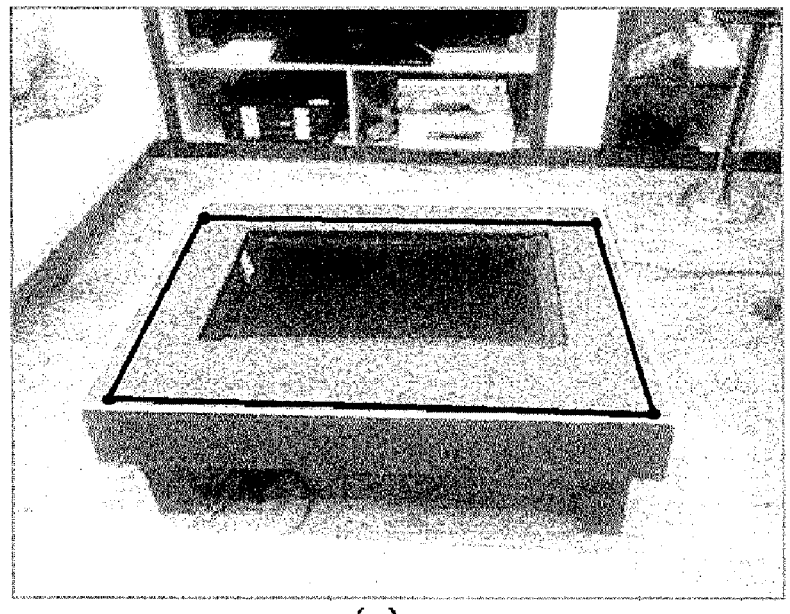
Figure 9:
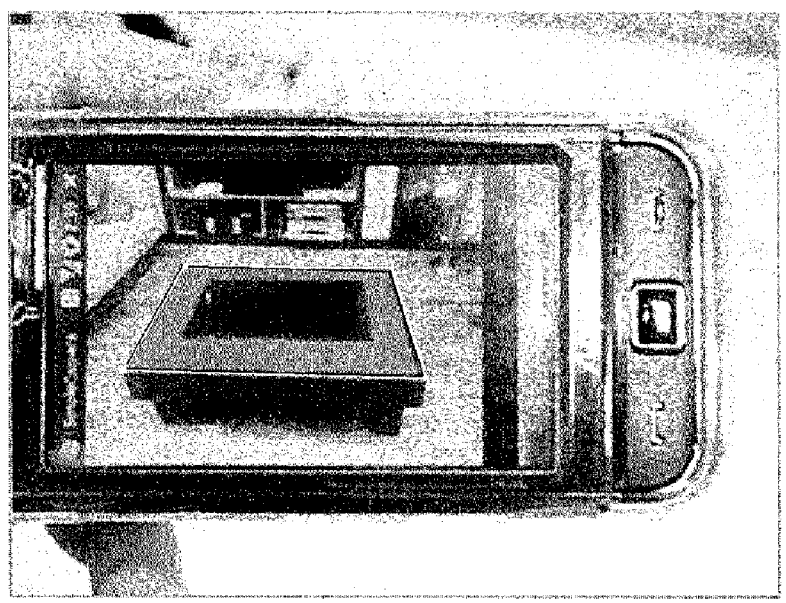
Figure 10:
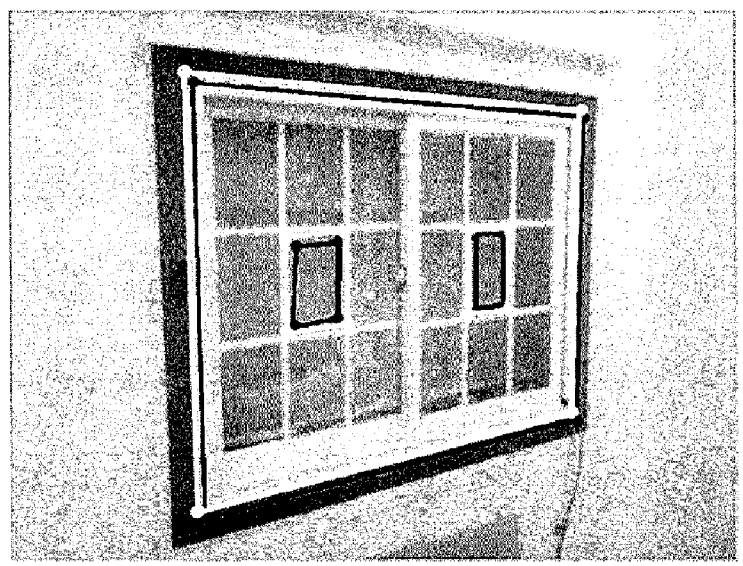
Figure 10:
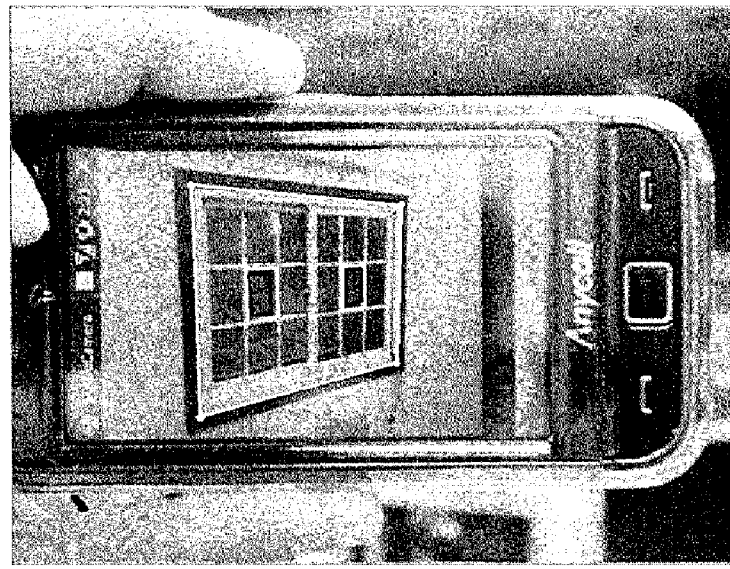

In FIGS. 9(a) and 10(b), a black line represents the modeling result based on the coordinate actually selected by the user, and a yellow line represents the modeling result based on the vertex coordinate detected semi-automatically through the proposed algorithm. Referring to FIGS. 9(a) to 10(b), according to the present embodiment, correct modeling is performed even in the case of an incorrect input in the mobile phone equipped with the touch screen. FIGS. 9(a) and 10(b) show modeling results based on the vertex detection according to the present embodiment in the mobile phone equipped with the touch screen, and FIGS. 9(a) and 10(a) show modeling results in a desktop computer for clarity. Referring to FIG. 10, according to the method of detecting a vertex of the present invention, a vertex can be correctly detected even in a narrow-width region.

According to the present embodiment, the performance of the proposed algorithm is evaluated by using still images previously photographed through a touch-screen mobile phone. The used images include three images for each object such as a table or a window in a room in which the three images are acquired by photographing the object at different angles. Each image has a dimension of 640*480, and one pixel of the image has 24-bit color values. In addition, according to the present invention, the experiment was performed by using a mobile phone equipped with a 3.3-inch touch screen, an ARM11 process having 800 MHz, and a 128 MB-SDRAM.

TABLE 1

| | Time to perform main steps of algorithm (ms) | | | |
|---|---|---|---|---|
| | min | max | μ | σ |
| Image blurring | 0.0 | 9.0 | 2.5 | 2.9 |
| Edge detection | 1.0 | 3.0 | 1.5 | 0.5 |
| Hough transform | 69.0 | 245.0 | 159.3 | 70.0 |
| Vertex detection | 1.0 | 8.0 | 4.4 | 1.9 |
| Total processing time | 142.0 | 294.0 | 237.6 | 23.9 |

Table 1 shows the time to perform the method of detecting a vertex according to the present invention.

As shown in table 1, the step of detecting the candidate straight line through the Hough transform requires the longest processing time as 159.3 ms on average in the method of detecting the vertex according to the present invention. This problem is caused due to the fine detection for the range related to the parameters because the inclination angle and the position of an edge (straight line) of an objet cannot be found. In this case, the processing time of the Hough transform may be prolonged as the number of edges used as input values is increased. According to the method of detecting the vertex of the present invention, a limited ROI region is set, and the blur function is applied to the limited ROI region to reduce noise edges from the image. Therefore, according to the method of detecting the edges of the present invention, the Hough transform is performed with respect to only main edges (straight line) of the object, so that the rapid processing time can be acquired to the extent that the user does no feel inconvenience in the interaction operation. In addition, since only parameters in the limited range are searched, the time required to detect a vertex does not exert an influence on the whole processing time of the algorithm according to the present invention.

As a result, the total time to perform the method of detecting the vertex according to the present invention is 237.6 ms on average, and includes time to internally perform an image copying process and a transformation process, as well as each main step of the present method of detecting the vertex. The method of detecting the vertex of the present invention may be performed at enhanced processing speed through the optimization procedure.

TABLE 2

| | RMS pixel error (pixel) | | | |
|---|---|---|---|---|
| | Min | max | μ | σ |
| Degree of sensing precision of touch screen in mobile phone | 0.0 | 1.40 | 6.3 | 3.39 |

Table 2 shows an experimental result for an error degree when an end user uses a touch screen mobile phone, and shows the measurement result of the degree of the sensing precision in the touch screen of the mobile phone.

FIGS. 11(a) and 11(b) are views showing an experimental procedure of the degree of sensing precision of the touch screen. FIG. 11(a) is a view showing the position of the first marked target (dot), and FIG. 11(B) is a view showing the sequence in which the target dot appears.

Figure 11:
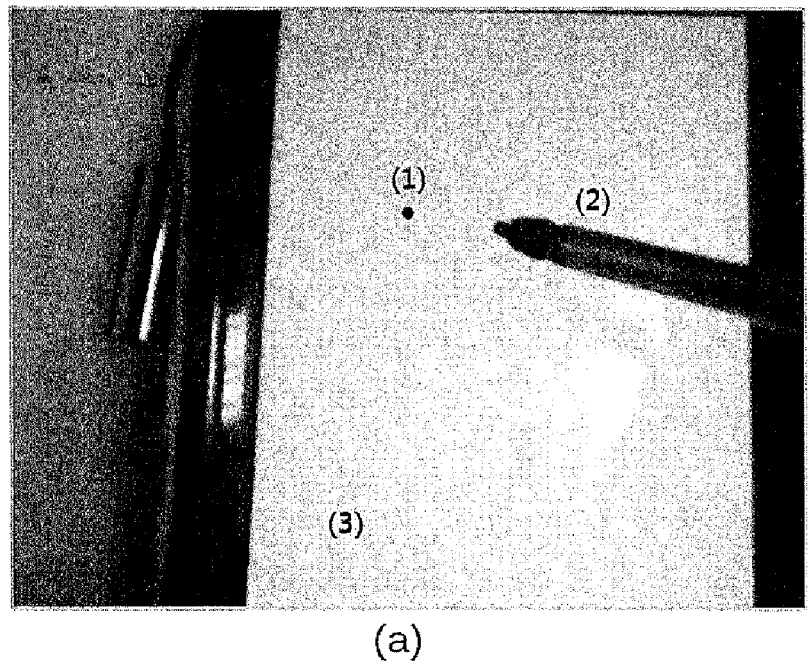
Figure 11:
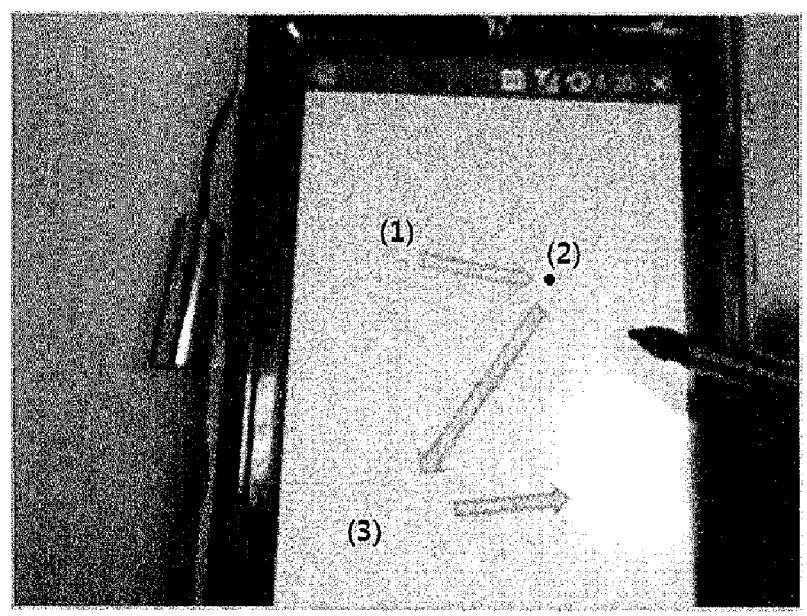

As shown in FIG. 11, a user correctly touches a position as much as possible on the touch display of the mobile phone. The user is requested to input 100 touches for each target, vertex coordinate data are collected, and the analysis of the vertex coordinates data is performed. As shown through the analysis of Table 2, the RMS (Root Mean Square) errors between a preset target position and a touch position actually input by the user represent a mean value (μ) of about 6.3 and the standard deviation (σ) of about 3.39. As recognized through the above experiment, it is difficult to perform vertex selection repeatedly required in the typical modeling procedure and to perform a fine adjustment step in the mobile phone, which may be sensing errors usually occurring when the touch screen mobile phone is used.

TABLE 3

| | RMS pixel error (pixel) | | | |
|---|---|---|---|---|
| | min | max | μ | σ |
| Nonuse of proposed algorithm | 1.0 | 11.0 | 5.7 | 2.8 |
| Use of proposed algorithm | 0.0 | 18.0 | 1.4 | 2.7 |
| Experimental result except for failed detection in proposed method | 0.0 | 3.0 | 0.9 | 0.7 |

Table 3 shows the degree of accuracy in the vertex detection when the method of detecting the vertex according to the present invention is applied. Table 3 shows the experimental results in the case in which a user repeatedly selects a vertex of an object contained in an image 100 times.

As shown in table 3, vertexes selected by a user in order to perform object modeling according to the related art represent a pixel error approximating to that of an experiment performed to check the degree of sensing precision of the touch screen installed in a mobile phone, which represents an average distance of about 5.7 pixels from a real vertex of the object. In contrast, the proposed algorithm represents the pixel error of about 1.4 pixels, which represents the degree of accuracy enhanced by about 4.3 pixels when comparing with the nonuse of the proposed algorithm. In this case, since the standard deviation is 2.7 pixels, the proposed algorithm may seem to be unstable. However, when the user selects a position far away from a real vertex of an object, a vertex closest to the selected position is detected due to the characteristic of the proposed algorithm. According to the experimental case, the erroneous detection occurs 4 times among 100 times. In this case, the detected vertex represents a pixel error value of 15 pixels. On the assumption that the user performs an exact initial input, if the case of the erroneous vertex detection is removed, the proposed algorithm represents a pixel error of a mean value of about 0.9 and a standard deviation of about 0.7 as shown in FIG. 3, which shows the strong detection performance. Therefore, when the proposed algorithm is used, a vertex can be exactly detected through a modeling process without a vertex adjustment process. Accordingly, modeling can be easily achieved in the mobile phone with less interaction operations.

As described above, according to the present embodiment, the ROI is set based on the selected coordinate input by the user, a blur function is applied to the ROI, and the edges of the ROI is detected, so that the edges of the main part of the object can be detected without the noise of the image. In addition, according to the present embodiment, parameters are searched in a limited range of the candidate straight lines detected through the Hough transform, so that the vertex detection (accuracy: the error of 1.4 pixels) can be performed at a rapid processing speed of 237.6 ms that the user does not feel inconvenience for modeling in a mobile phone having a low computing power. In addition, according to the present embodiment, the vertex is detected semi-automatically, so that the correct vertex of the object can be detected even if the user roughly selects a vertex in a touch screen mobile phone that cannot provide the fine selection and adjustment process. Therefore, the modeling can be performed with fewer interactions.

According to the present embodiment, the total time to perform vertex detection is 237.6 ms on average, and includes time to internally perform an image copying process and a transformation process, as well as each main step of the present method of detecting the vertex. The method of detecting the vertex of the present invention may be performed at enhanced processing speed through the optimization procedure.

In an apparatus of detecting a vertex of an image according to another embodiment of the present invention, and a method for the same, there is provided an expanded algorithm of detecting the ROI semi-automatically with respect to a square region based on a scheme of selecting one vertex.

In order to recognize an object even if the lighting is changed or a user direction through a camera is changed, the correct detection of the ROI is important. The present embodiment proposes an algorithm of semi-automatically detecting the ROI by drawing a line at one time. In more detail, a binary scheme of adaptively setting a critical value, a semi-automatic vertex detection scheme based on a Hough transform scheme, and a scheme of predicting a vertex, which is not input by a user, by detecting intersection points of lines forming the detected vertex, thereby detecting the ROI semi-automatically.

Figure 12:
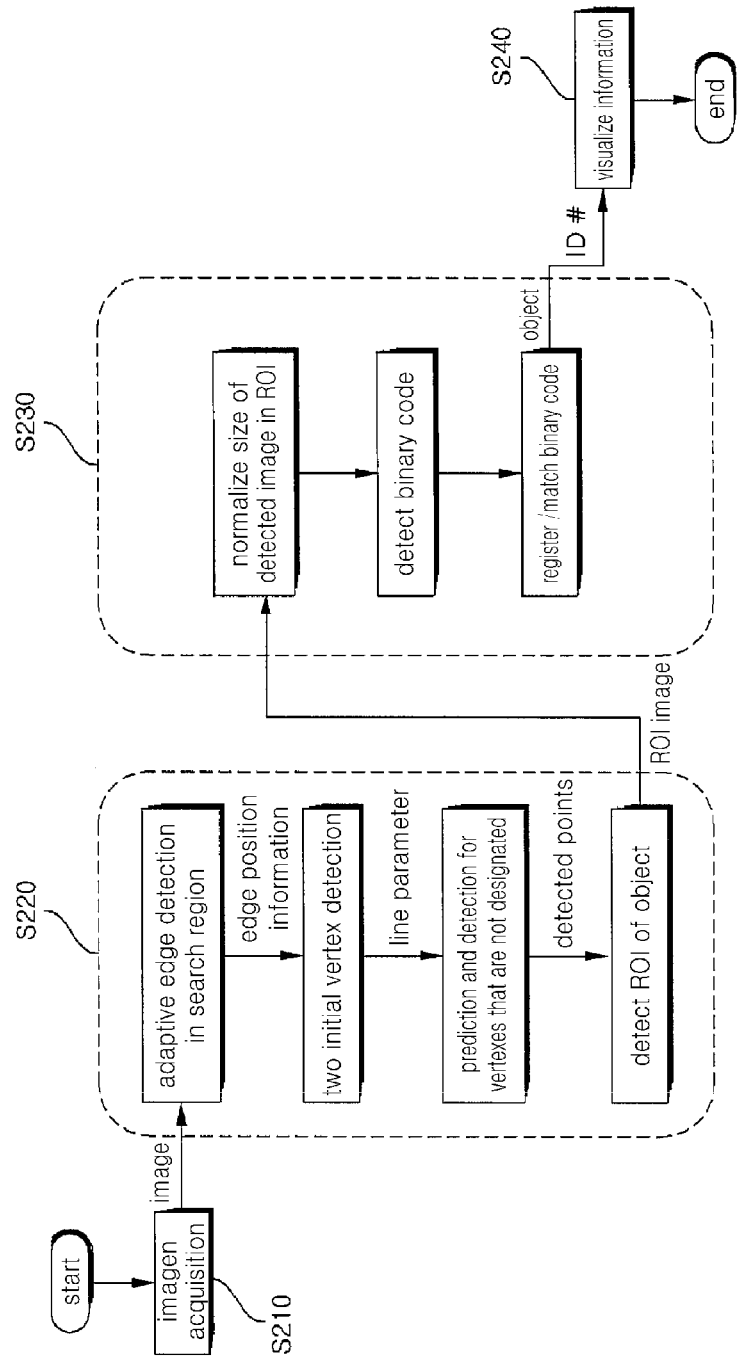
FIG. 12 is a flowchart showing a method of detecting a vertex of an image according to another embodiment of the present invention.
Figure 13:
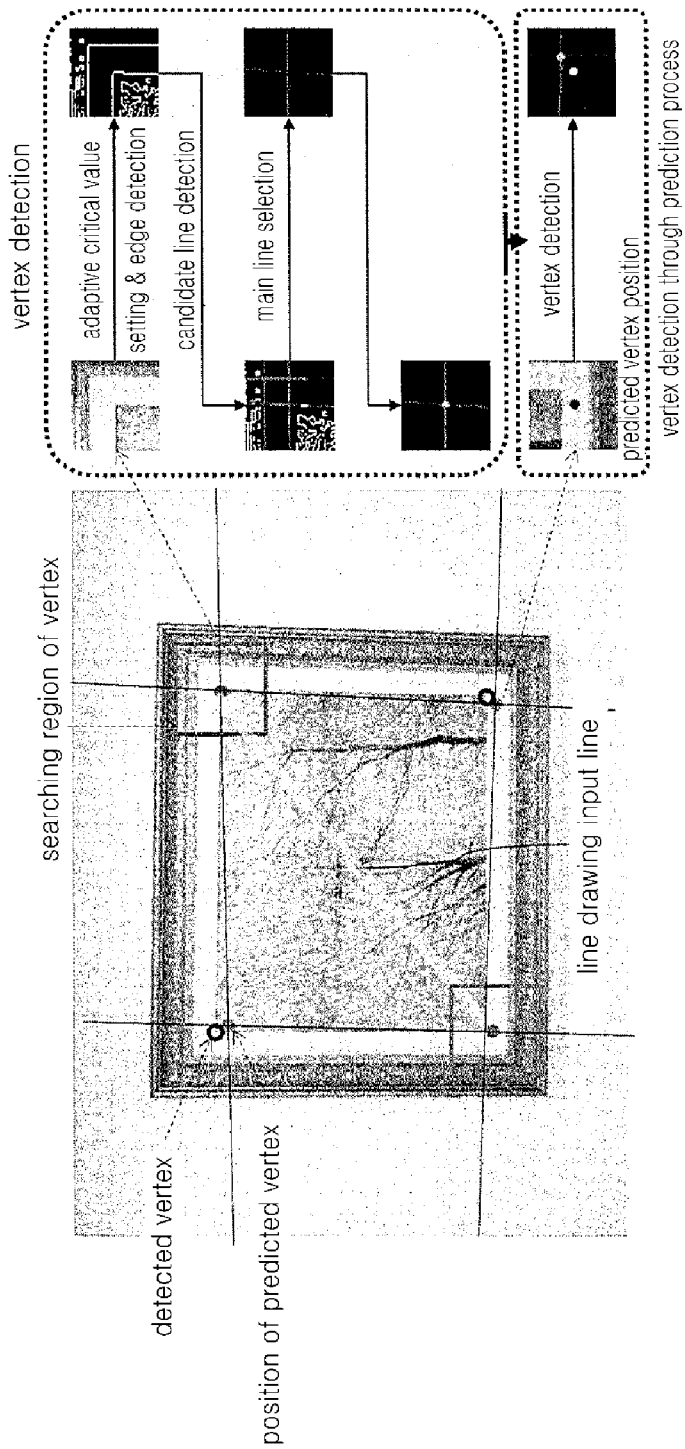
FIG. 13 is a view showing a scheme of semi-automatically detecting an ROI by applying a semi-automatic vertex detection scheme and a scheme of predicting a vertex, which is not input by a user, by detecting intersection points of lines forming the detected vertex.

FIG. 12 is a flowchart showing a method of detecting a vertex of an image according to another embodiment of the present invention, and FIG. 13 is a view showing a scheme of semi-automatically detecting an ROI by applying a semi-automatic vertex detection scheme and a scheme of predicting a vertex, which is not input by a user, by detecting intersection points of lines forming the detected vertex.

As shown in FIGS. 12 and 13, a user performs a dragging operation from one corner of rectangular region to be detected to an opposite corner in a diagonal direction, which is the first step of performing the present algorithm. The start point and the end point of a line designated through the dragging operation are set for two initial searching regions used to semi-automatically detect vertexes. Thereafter, according to the proposed algorithm, as shown in FIG. 12, the edges of the designated searching region are detected by using an adaptively-set threshold value. Next, as shown in FIG. 13, the edges are input, thereby detecting vertexes through a semi-automatic scheme based on the Hough transform. In this process, the algorithm detects two main lines used to make the detected vertex. In this case, one line making the detected vertex is selected, and another line making another detected vertex crossing the line in the image region is searched. Accordingly, the algorithm can predict a vertex, which is not designated in the initial stage by the user, as shown in a blue dot of FIG. 13. Thereafter, the predicted point is placed in the vertex searching region, and a vertex can be detected through a semi-automatic scheme based on the Hough transform. The ROI can be detected by using the vertex, which is acquired in the above manner, through one line dragging operation of the user.

The detected region can be applied for the exact recognition of the object by applying an object recognition scheme based on an LBP or another feature point (e.g., SIFT and the like). The LBP-based recognition of FIG. 12 shows that the proposed algorithm for detecting an ROI cooperates with an LBP-based recognition scheme, which is one of recognition algorithms, to clearly recognize an object.

Although a preferred embodiment of the present invention has been described for illustrative purposes, those skilled in the art will appreciate that various modifications, additions and substitutions are possible, without departing from the scope and spirit of the invention as disclosed in the accompanying claims.

The present invention relates an apparatus for detecting a vertex of an image and a method for the same, capable of detecting the vertex with the high degree of accuracy and reducing time to detect the vertex by minimizing the interaction operations of the user to detect the vertex even if the user uses a touch input part having the low degree of sensing precision. The present invention is applicable to various image processing fields such as a touch-screen terminal.

What is claimed is:

1. An apparatus for detecting a vertex of an image, the apparatus comprising:
a UI part used to display an image and input a vertex position of the image;
an ROI setting part to set an ROI including the input vertex position;
an edge detector to detect a plurality of edges from an image in the ROI, and to detect a candidate straight line group based on the edges; and
a vertex detector to remove a candidate straight line, which forms an angle less than a critical angle with respect to a base candidate straight line set from the candidate straight line group, and to determine an intersection point between a remaining candidate straight line and the base candidate straight line, which is provided at a position making a minimum distance from the input vertex position, as an optimal vertex.

2. The apparatus of claim 1, wherein the UI part comprises a display part having a degree of sensing precision with an error of 10 pixels or less.

3. The apparatus of claim 1, wherein a display part is a touch screen installed in a mobile phone and is used to realize an UI.

4. The apparatus of claim 1, wherein the ROI setting part sets the ROI having a preset range formed about the input vertex position.

5. The apparatus of claim 1, wherein the edge detector removes a camera image noise by applying a Gaussian blur function to the image of the ROI, and detects the edges by using a canny edge detector.

6. The apparatus of claim 5, wherein the edge detector transforms the edges into the candidate straight line group expressed by a parameter set having an angle and a distance by applying a Hough transform to the edges.

7. The apparatus of claim 5, wherein the edge detector arranges candidate straight line groups in descending order from a greatest number of times of being voted when performing the Hough transform.

8. The apparatus of claim 7, wherein the vertex detector sets a predetermined candidate straight line, which belongs to the candidate straight line group and has the greatest number of times of being voted, as the base candidate straight line.

9. The apparatus of claim 7, wherein the vertex detector removes a corresponding candidate straight line group if a difference between an angle of the candidate straight line group and an angle of the base candidate straight line is less than the critical angle, and a difference between a distance of the candidate straight line group and a distance of the base candidate straight line is less than a critical distance.

10. The apparatus of claim 7, wherein the vertex detector removes a candidate straight line of the candidate straight line group, which makes a difference less than a critical distance with respect to a distance of the base candidate straight line, from a base candidate straight line group.

11. A method of detecting a vertex of an image, the method comprising:
inputting, by a UI part, a vertex position of an image;
setting, by an ROI setting part, an ROI including the input vertex position;
detecting, by an edge detector, a plurality of edges from an image in the ROI;
detecting, by the edge detector, a candidate straight line group based on the edges; and
removing, by a vertex detector, a candidate straight line, which forms an angle less than a critical angle with respect to a base candidate straight line set from the candidate straight line group, and determining an intersection point between a remaining candidate straight line and the base candidate straight line, which is provided at a position making a minimum distance from the input vertex position, as an optimal vertex.

12. The method of claim 11, wherein, in the detecting of the edges, a camera image noise is removed by applying a Gaussian blur function to the image of the ROI, and the edges are detected by using a canny edge detector.

13. The method of claim 11, wherein, in the detecting of the candidate straight line group, the edges are transformed into the candidate straight line group expressed by a parameter of an angle and a distance by applying a Hough transform to the edges.

14. The method of claim 13, wherein, in the detecting of the candidate straight line group, candidate straight line groups are arranged in descending order from a greatest number of times of being voted when performing the Hough transform.

15. The method of claim 14, wherein, in the detecting of the vertex point, a predetermined candidate straight line, which belongs to the candidate straight line group and has the greatest number of times of being voted, is set as the base candidate straight line.

16. The method of claim 13, wherein, in the detecting of the vertex point, a corresponding candidate straight line group is removed if a difference between an angle of the candidate straight line group and an angle of the base candidate straight line is less than the critical angle, and a difference between a distance of the candidate straight line group and a distance of the base candidate straight line is less than a critical distance.

17. The method of claim 13, wherein, in the detecting of the vertex, a candidate straight line of the candidate straight line group, which makes a difference less than a critical distance with respect to a distance of the base candidate straight line, is removed from a base candidate straight line group.

18. A computer-readable recording media to store a computer program used to execute the method according to claim 11 in a computer.

* * * * *